(12) United States Patent
Spatz et al.

(10) Patent No.: US 6,228,195 B1
(45) Date of Patent: May 8, 2001

(54) SONIC SEALED BIAS SEAM

(75) Inventors: Martin W. Spatz, River Vale; Harvey Friedman, Princeton, both of NJ (US)

(73) Assignee: Star Binding & Trimming Corp., North Bergen, NJ (US)

( * ) Notice: Subject to any disclaimer, the term of this patent is extended or adjusted under 35 U.S.C. 154(b) by 0 days.

(21) Appl. No.: 09/245,911

(22) Filed: Feb. 8, 1999

(51) Int. Cl.[7] .................................................. B32B 31/16
(52) U.S. Cl. ........................ 156/64; 156/73.1; 156/193; 156/203; 156/267
(58) Field of Search ........................... 156/64, 73.1, 73.3, 156/193, 203, 267

(56) References Cited

U.S. PATENT DOCUMENTS

| 2,265,075 | 12/1941 | Knuetter | 93/35 |
|---|---|---|---|
| 3,524,781 | 8/1970 | Winterroth et al. | 156/231 |
| 3,657,033 | 4/1972 | Sager | 156/73.1 |
| 3,666,599 | 5/1972 | Obeda | 156/580.1 |
| 3,852,144 | 12/1974 | Parry | 156/510 |
| 3,870,478 | 3/1975 | Rohlfing | 29/2.1 |
| 4,096,010 | 6/1978 | Parham et al. | 156/179 |
| 4,333,791 | 6/1982 | Onishi | 156/580.1 |
| 4,373,982 | 2/1983 | Kreager et al. | 156/359 |
| 4,426,244 | 1/1984 | Wang | 156/498 |
| 4,444,614 | 4/1984 | Krayer | 156/580.2 |
| 4,496,407 | 1/1985 | Lowery, Sr. et al. | 156/73.3 |
| 4,534,819 | 8/1985 | Payet et al. | 156/515 |
| 4,658,454 | 4/1987 | Potter | 5/497 |
| 4,770,729 | 9/1988 | Spencer et al. | 156/73.1 |
| 4,809,413 | 3/1989 | Upmeier | 29/2.18 |
| 5,658,408 | * | 8/1997 | Frantz et al. | 156/64 |
| 5,855,706 | * | 1/1999 | Grewell | 156/64 |
| 5,880,580 | * | 3/1999 | Johansen | 323/282 |
| 6,036,796 | * | 3/2000 | Halbert et al. | 156/64 |

FOREIGN PATENT DOCUMENTS

EP-0123456 * 1/2000 (EP) ..................................... 100/100

* cited by examiner

*Primary Examiner*—James Sells
(74) *Attorney, Agent, or Firm*—Nixon & Vanderhye P.C.

(57) ABSTRACT

A method and apparatus for forming an ultrasonic bias seam includes a rotary anvil disposed within a housing for rotation with the fabric being sealed. A selvage puller separates the selvage from the fabric. After sealing the fabric with the ultrasonic sealing head, the fabric is then cut in a spiral pattern at a predetermined angle. The resulting single-ply bias seam eliminates bulk, has a clean finished look and provides a completely sealed seam.

16 Claims, 2 Drawing Sheets

SONIC SEALED BIAS SEAM

BACKGROUND OF THE INVENTION

The present invention relates to a process and apparatus for forming a bias seam, and more specifically, to a process and apparatus for forming a bias seam using an ultrasonic sealing apparatus.

Bias binding containing a bias seam, or a seam on the bias, is generally used to bind edges or cover seams to give a product a finished look. The bias binding is arranged such that the threads or yarns of the fabric run on an angle from the edge rather than parallel or perpendicular to the edge. This permits the binding to have some elasticity or stretch enabling the binding to go around curves or corners and lay flat without puckering. A straight binding, i.e., not on the bias, would appear unappealing if sewn other than in a straight line as it would pucker when sewn around curves.

To prevent fraying of the edges, the edges to be sewn together are folded under to produce a "clean finish." An apparatus for folding the binding edges is attached to the sewing machine. The apparatus folds each edge and guides it to the needle. The presently used sewn bias binding thus has two butterfly edges on the reverse side of the seam. The two-ply butterfly edges create bulk which can have difficulty passing through finishing attachments. In addition, the sewn seam has holes from the sewing needle and spaces between the stitches regardless of how close they are together. Hence, the seam is subject to leakage.

The folding apparatus described above is capable of accommodating single bindings and multiple bindings. When the seams of the bindings are passed through the folding apparatus, the butterflies on the back of the seam, especially with multiple bindings, cause considerable friction in the folding apparatus, which results in inconsistent feeding, irregular stitches and defects. Still further, there are times when the butterflies are caused to be turned back at the entrance of the folding apparatus resulting in three-ply bulk, thereby making the problem of friction even worse.

Sewn bias seams also have a tendency to pull apart slightly at the edges as it is impossible to lock either the first stitch or the last stitch.

Ultrasonic bonding is a well-known process in which high frequency vibrations are imparted into two or more plies of a thermoplastic material with a horn. The horn vibrates adjacent to an anvil which supports the material. The vibrations develop frictional heat at the seam interface, subsequently bonding the material together. Materials may also be cut or slit with an ultrasonic horn while sealing the edges. The ultrasonic horn couples mechanical vibrations into the material, while the anvil supports the material during the sealing process.

A review of the ultrasonic binding art indicates a need for a process of and an apparatus for forming a bias seam using an ultrasonic sealing apparatus.

U.S. Pat. No. 3,666,599 to Obeda describes an ultrasonic seaming apparatus in which the feed rate of the workpiece through the seaming station and the velocity of the resonator are interconnected in such a manner that both are varied in a predetermined relationship.

U.S. Pat. No. 3,852,144 to Parry describes an ultrasonic seaming and cutting apparatus having a resonant horn, a rotating anvil wheel and a cutting surface disposed in juxtaposition with the anvil wheel. The apparatus is adapted to simultaneously cut and fuse the material adjacent the seamed area without excessive wear in the instrumentality providing such cutting action.

U.S. Pat. No. 4,333,791 to Onishi describes an ultrasonic seam welding apparatus for seam welding at least two sheet-like work pieces piled one above the other. The seam welding is carried out by imparting the ultrasonic oscillation to the workpieces from the converter-horn assembly with the aid of the roller.

U.S. Pat. No. 4,373,982 to Kreager et al. describes an ultrasonic sealing apparatus where plastic film in sheet form is supplied to a forming unit which forms the plastic film into tubular form with overlapping edges. The edges are caused to pass along an anvil and the horn of an ultrasonic sealing unit for effecting ultrasonic sealing of the edges. The edges of the film are passed through a gap between the horn and the anvil.

A publication by Sonobond Ultrasonics Company titled "Ultrasonic Techniques for Thermoplastic Fabrics and Apparel" describes the ultrasonic sealing process in connection with thermoplastic fabrics and apparel. Under Cut and Seal Edge Finishing, the company describes sealing of the ends of a bias tape to prevent raveling using an ultrasonic apparatus. This process is unrelated to forming a bias seam.

For details concerning the design and construction of the ultrasonic sealing apparatus, reference is made to the book entitled "Ultrasonic Engineering" by Julian R. Frederick, John Wiley & Sons, Inc., New York, N.Y. (1965).

All patents and publications cited in the specification are herein incorporated by reference.

SUMMARY OF THE INVENTION

Accordingly, it is an object of the present invention to provide a process and apparatus for forming an ultrasonic bias seam that overcomes the above-described problems in the prior art.

It is another object of the present invention to provide a process and apparatus for forming an ultrasonic bias seam in which the resulting seam is strong, has a single ply, has a clean finished look and is sealed such that leakage is prevented through the seam.

The ultrasonic sealing operation is substantially faster than the sewing operation. Hence, the sonic sealed bias seam realizes another advantage over the prior art in being produced at a much faster rate of production. As a result, however, many adaptations had to be developed, especially in the feeding of the fabric, to accommodate the ultrasonic sealing apparatus.

These and other objects are obtained by providing a process of forming a sonic sealed bias seam using an ultrasonic sealing apparatus having an ultrasonic sealing head and an anvil. The process includes the steps of folding the fabric such that two edges are substantially adjacent one another periodically ensuring that the ultrasonic sealing apparatus is accurately tuned, sealing the edges with the ultrasonic sealing apparatus, thereby forming a tube of fabric, and cutting the tube of fabric in a spiral pattern at a predetermined angle.

In another aspect of the present invention, the process further includes, simultaneous with the sealing step, the steps of cutting selvage from the tube of fabric with the anvil and separating the selvage from the tube of fabric.

In another aspect of the present invention, the process further includes the step of feeding the selvage to a selvage disposal apparatus with a selvage feeding device, the selvage feeding device feeding the selvage at a speed substantially equal to a feed speed of the fabric.

In still another aspect of the present invention, the process further includes the step of controlling air pressure on the anvil. The air pressure is provided by an air pressure source. The controlling step further includes the steps of driving the anvil with the air pressure source to change its contact position relative to the horn, raising and lowering the anvil with the air pressure source, and cooling the anvil and the horn with the air pressure source.

In yet another aspect of the present invention, the cutting step includes the steps of feeding the tube of fabric over a supporting device, the supporting device supporting the tube of fabric in a tubular form, and rotating the supporting device while feeding the fabric in a direction parallel to a longitudinal axis of the tube of fabric through a knife assembly.

The apparatus of the present invention provides unique structure for performing the above-described process steps. In addition, the anvil is disposed within a housing. The selvage feeding device includes a pair of rollers adapted to pull the selvage to the selvage disposal apparatus, the rollers being driven by a motor. The selvage disposal apparatus includes a tube connected to a vacuum source, wherein the rollers feed the selvage into the tube.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Figure 1:
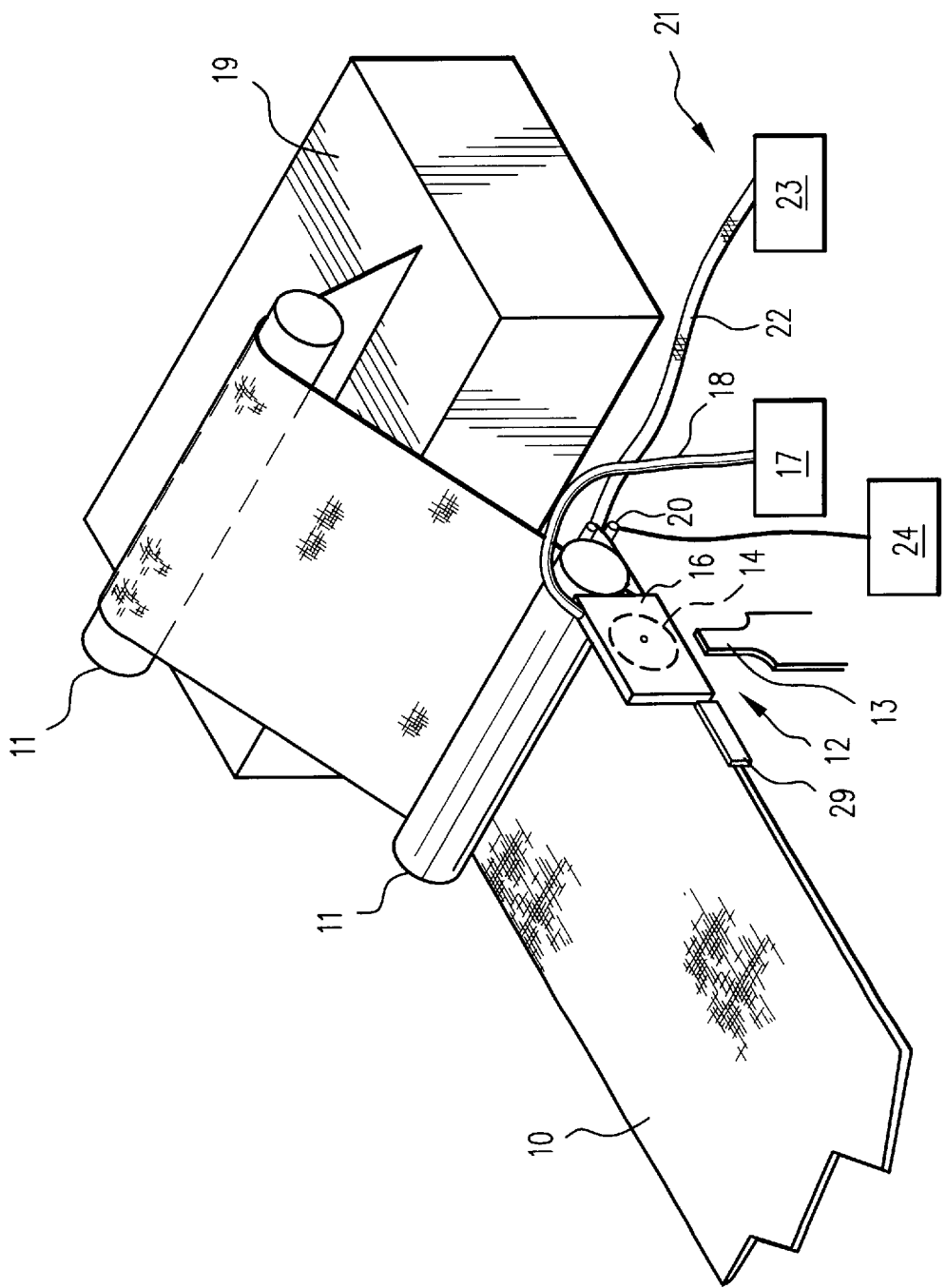
FIG. 1 is a perspective view of the feeding arrangement with the ultrasonic sealing apparatus of the present invention.

Referring to the FIGURES the process and apparatus for forming the bias seam will now be described in detail. Referring to FIG. 1, a piece of fabric 10 that has been folded in half is fed by a feeding device 11 through an ultrasonic sealing apparatus 12 forming a tube of fabric. The folded fabric is preferably guided to ultrasonic sealing apparatus 12 with a guide member 29 so that the fabric is properly aligned with the anvil before sealing. Ultrasonic sealing apparatus 12 includes an ultrasonic sealing head 13 and a rotatably mounted anvil 14. Anvil 14 serves as a support backing for the vibrating ultrasonic sealing head 13 and supports the fabric being fed between them. Anvil 14 also acts as a circular blade providing for simultaneous cutting of selvage during sealing of the fabric.

It is essential to proper and effective seal formation that the ultrasonic sealing apparatus is accurately tuned to output an appropriate frequency. Improper frequency output causes inconsistent sealing, potentially causing openings in the seal and a generally weaker seal. To ensure that the sealing apparatus is accurately tuned, the apparatus is calibrated periodically with a known calibrating procedure. For example, the sealing apparatus is calibrated periodically after processing between about 5,000–25,000 yards of material.

Anvil 14 is housed within a housing 16 attached to a source of pressurized air 17 by means of a tube 18. The pressurized air drives anvil 14 at periodic times to change its contact position with the horn to provide even wear of the anvil and maximize its use. The pressurized air raises and lowers anvil 14 to enable insertion and removal of the fabric. In addition, the pressurized air is used to cool the anvil and the horn. Ultrasonic sealing can create high temperatures causing burning of the fabric and softening of the anvil and horn thereby causing deformation of the anvil and the horn.

Downstream of ultrasonic sealing apparatus 12, the fabric is driven by a driving or feeding device 11 to a storing location 19, such as a box. A pair of rollers 20 disposed downstream of ultrasonic sealing apparatus 12 pull the selvage at the same speed as the moving fabric to a selvage disposal apparatus 21. It is important that the selvage be pulled at the same speed as the fabric to prevent build-up or in the alternative, to prevent dragging. Rollers 20 are driven by a suitable driving apparatus 24 shown in schematic form in FIG. 1. Driving apparatus 24 is preferably a motor whose output shaft is attached to a conveyor belt, which in turn drives rollers 20 at a predetermined speed. The selvage is preferably driven into a suction tube 22 connected to a vacuum source 23 to remove the selvage from the area of the welding. This also simplifies the process and structure by eliminating interference between the fabric and the selvage.

Figure 2:
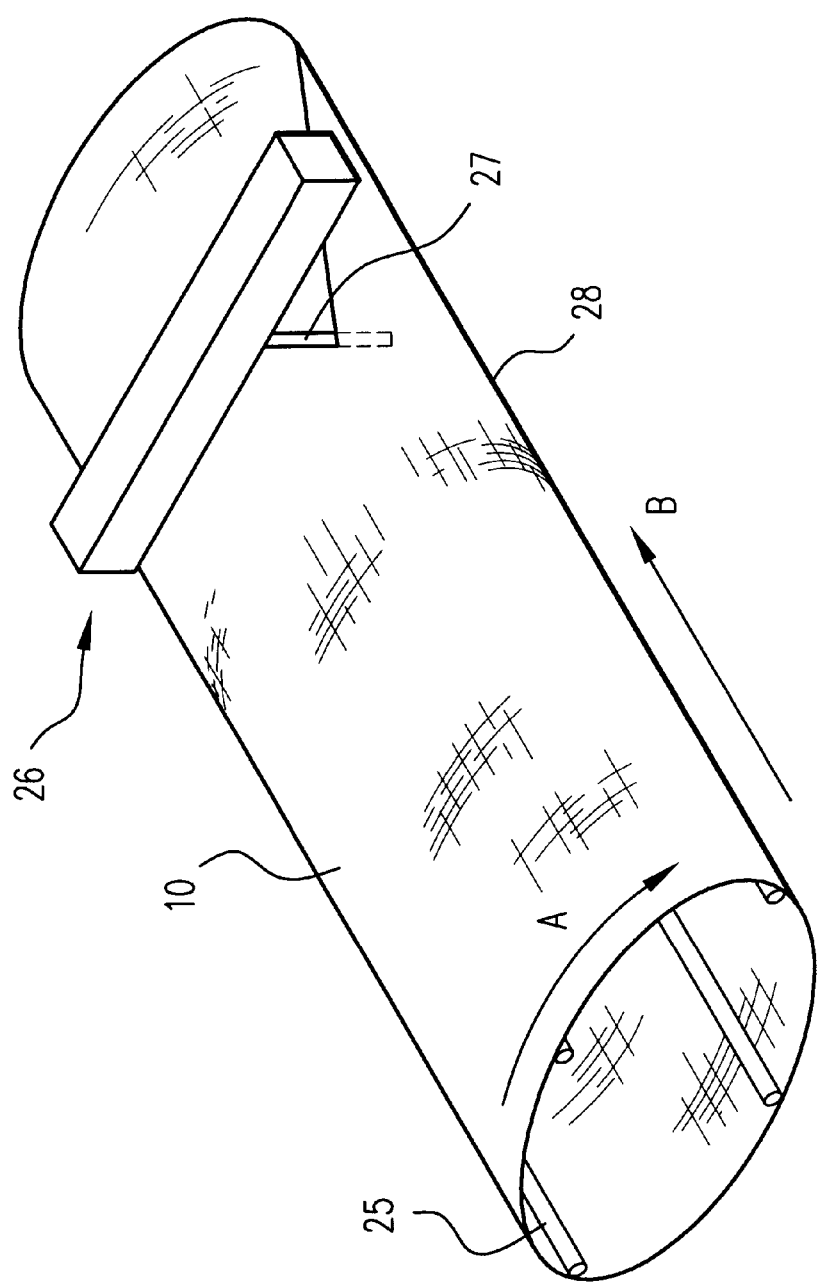
FIG. 2 is a perspective view of the knife assembly of the present invention.

Referring to FIG. 2, the tube of fabric is then removed from storing location 19 to a second storing location (not shown) of a knife assembly 26. The second storing location is supported on a revolving deck. Alternatively, storing location 19 may be moved to the revolving deck. The tube of fabric is fitted over a plurality of extension bars 25. Extension bars 25 are adjustable to accommodate different sized fabric. The tube of fabric is driven longitudinally through knife assembly 26 (indicated by arrow B in FIG. 2), which supports a knife 27 while the tube of fabric is rotated (indicated by arrow A in FIG. 2). This causes a sealed seam 28 to be placed on an angle in the range of 30–60°, and preferably about 45°. The cut fabric is then rolled up on the front of the machine and brought to a slitting unit to be cut into various widths as desired.

The resulting sonic sealed bias seam is suitable for many applications, is strong, has a clean-finished look and will not leak through the seam.

Although the invention has been described in detail, many variations will become apparent to those skilled in the art without departing from the scope of the invention, which is defined in the following claims. For example, driving device 11 can be any suitable means to achieve the stated purpose, and the present invention is not meant to be limited to the configuration depicted in FIG. 1. Additionally, knife assembly 26 may similarly be arranged in any manner to achieve its stated purpose, and the present invention is not meant to be limited to the configuration depicted in FIG. 2.

What is claimed is:

1. A process of forming a sonic sealed bias seam using an ultrasonic sealing apparatus having an ultrasonic sealing head and an anvil, the process comprising the steps of:

folding a piece of fabric such that two edges are substantially adjacent one another;

periodically ensuring that said ultrasonic sealing apparatus is accurately tuned;

sealing said edges with said ultrasonic sealing head, thereby forming a tube of fabric; and cutting said tube of fabric in a spiral pattern at a predetermined angle.

2. A process according to claim 1, further comprising, simultaneous with said sealing step, the steps of cutting selvage from said tube of fabric with said anvil and separating the selvage from said tube of fabric.

3. A process according to claim 2, further comprising the step of feeding said selvage to a selvage disposal apparatus with selvage feeding structure, said selvage feeding structure feeding said selvage at a speed substantially equal to a feed speed of the fabric.

4. A process according to claim 2, further comprising the step of controlling air pressure to said anvil.

5. A process according to claim 4, wherein said air pressure is provided by an air pressure source, the process further comprising the step of rotating said anvil with said air pressure source to change its contact position relative to said ultrasonic sealing head.

6. A process according to claim 5, further comprising the step of raising and lowering said anvil with said air pressure source.

7. A process according to claim 6, further comprising the step of cooling said anvil and said ultrasonic sealing head with said air pressure source.

8. A process according to claim 2, further comprising the step of controlling said separating of the selvage in accordance with a feed speed of the fabric.

9. A process according to claim 1, wherein said step of cutting said tube of fabric comprises the steps of:

feeding said tube of fabric over a supporting assembly, said supporting assembly supporting said tube of fabric in a tubular form; and rotating said supporting assembly while feeding said fabric in a direction parallel to a longitudinal axis of said tube of fabric through a knife assembly.

10. A process according to claim 9, wherein said supporting assembly is a plurality of extension bars.

11. A process according to claim 1, wherein said predetermined angle is in the range of 30–60°.

12. A process according to claim 11, wherein said predetermined angle is about 45°.

13. A process according to claim 1, further comprising the step of controlling feeding of said fabric.

14. A process according to claim 13, wherein said controlling step comprises the step of removing selvage from said tube of fabric.

15. A process according to claim 14, wherein said controlling step further comprises the steps of feeding said selvage to a selvage disposal apparatus with selvage feeding structure and controlling said feeding of said selvage in accordance with a feed speed of the fabric.

16. A process according to claim 1, wherein said periodically ensuring step comprises calibrating said ultrasonic sealing apparatus after processing about 5,000–25,000 yards of material.

\* \* \* \* \*

UNITED STATES PATENT AND TRADEMARK OFFICE
CERTIFICATE OF CORRECTION

PATENT NO. : 6,228,195 B1
DATED : May 8, 2001
INVENTOR(S) : Spatz et al.

It is certified that error appears in the above-identified patent and that said Letters Patent is hereby corrected as shown below:

Column 1,
Line 14, (application page 1, line 13), delete "curves of comers and insert -- curves or corners --.

Signed and Sealed this

Eleventh Day of September, 2001

*Attest:*

NICHOLAS P. GODICI
*Attesting Officer*   *Acting Director of the United States Patent and Trademark Office*